G. FILTZ.
HAULING DEVICE.
APPLICATION FILED DEC. 22, 1911.

1,196,093.

Patented Aug. 29, 1916.
2 SHEETS—SHEET 1.

Witnesses—
Stanley Wood
John T. Bash

Inventor
Georges Filtz
by
Attorney.

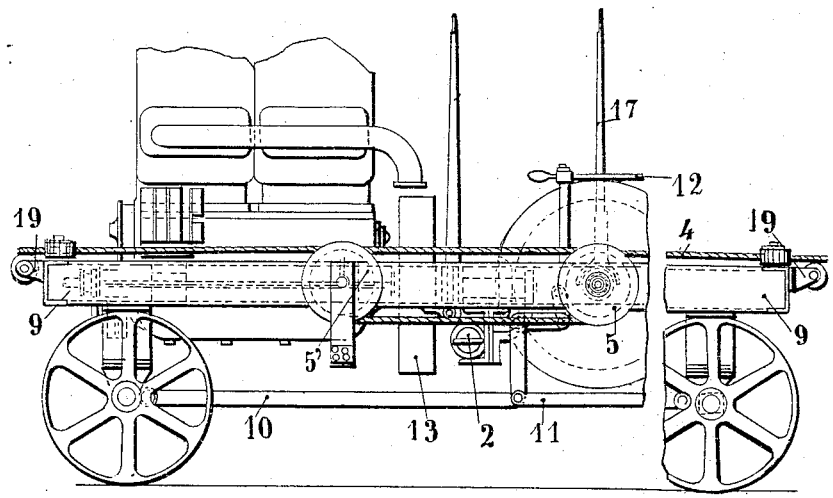
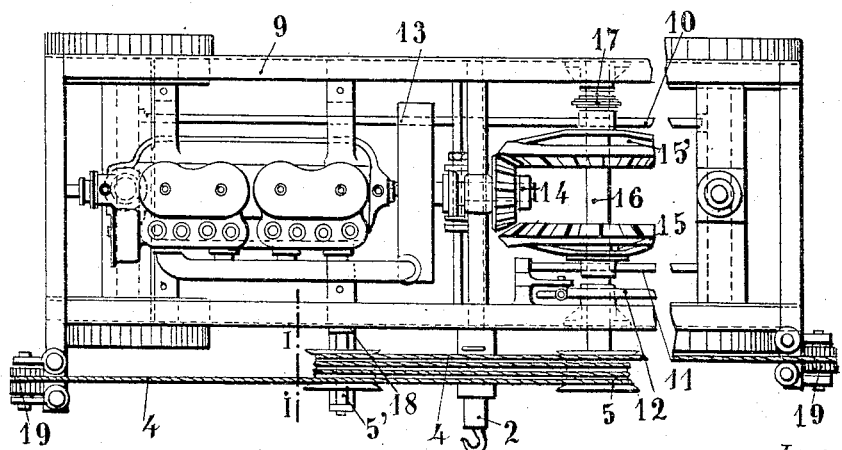

UNITED STATES PATENT OFFICE.

GEORGES FILTZ, OF JUVISY, FRANCE.

HAULING DEVICE.

1,196,093.

Specification of Letters Patent.   Patented Aug. 29, 1916.

Application filed December 22, 1911. Serial No. 667,403.

*To all whom it may concern:*

Be it known that I, GEORGES FILTZ, a citizen of the French Republic, residing at Juvisy, Seine-et-Oise, France, have invented a certain new and useful Hauling Device, of which the following is a specification.

The present invention has for its object a hauling device for use on land, on water and on rails, applicable to all vehicles, for conveying goods and to apparatus or machines of any type whatever, but especially adapted for hauling agricultural implements (plows, harrows, rollers and the like).

As regards the application of the invention to the hauling of agricultural implements it should be remarked that it is known in general to move a tractor or implement provided with a suitable motor device, between two anchors to which a cable is attached, on which the tractor hauls so as to be moved in one direction or in the other. All inventors and constructors, however, who have endeavored to carry out this problem have been confronted with two obstacles which have not hitherto been solved practically, but which are solved according to the present invention.

The first obstacle consists in the difficulty of preventing the cable from slipping on the hauling drum carried by the tractor or by the plow. The second obstacle which, as will be seen, is intimately connected with the first, consists in the difficulty of obtaining anchors which while offering resistance against displacement can be easily moved on the ground itself in the longitudinal direction, and on the road when employed for purposes of conveyance. In the present invention, these two obstacles have been solved by the means shown in the accompanying drawings in which—

Figure 1:
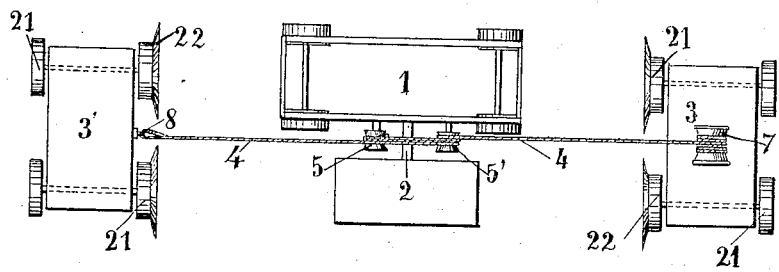
Figure 5:
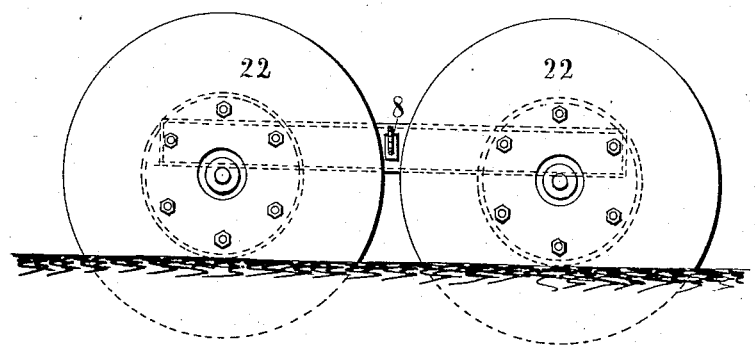
Figure 4:
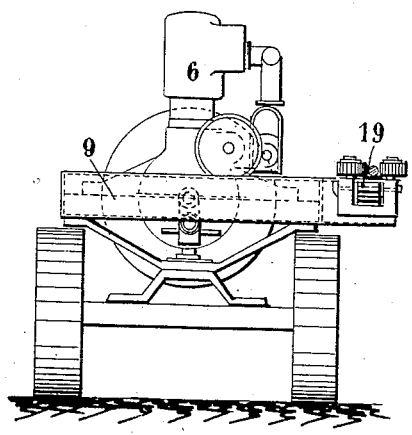
Figure 6:
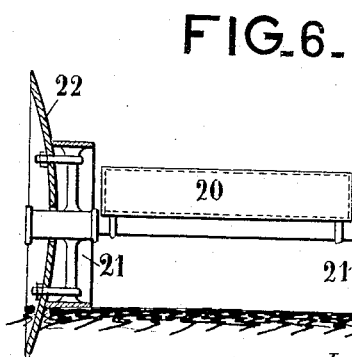

Figure 1 is a diagrammatic view of the whole installation seen in plan. Fig. 2 is a side elevation of the tractor; Fig. 2ª is a sectional elevation showing the grooved rim of the pulley 5, or 5'. Fig. 3 is a plan view thereof. Fig. 4 shows an end view of the tractor. Fig. 5 shows in longitudinal elevation one of the anchor cars which in Fig. 6 is shown in section through one of the axletrees.

The device comprises the following elements: A tractor 1 shown in Figs. 2, 3 and 4; to this tractor is connected by means of a connecting bar 2, the length of which can be regulated, the plow or the vehicle of any type which is to be set in motion. Two anchor cars 3, 3', are provided to which the ends of the cable 4 are respectively attached, this cable passing over two adjacent pulleys or sheaves 5, 5'. The pulley 5 is driven by a motor 6 provided on the tractor and the pulley 5' runs loose on an axis parallel to the axis of the pulley 5. One of the anchor cars, the car 3, is provided with a windlass 7 which is furnished with a suitable ratchet device, and with which is connected one of the extremities of the cable 4; the car 3' is provided with a suitably arranged hook 8 to which is attached the other extremity of the cable 4.

The tractor comprises a chassis 9 mounted on four wheels coupled two by two on pivoting axle-trees; a bar 10 connects these two axle-trees; a bar 11 is connected to one of these axle-trees and joins it to a control device with which is connected a steering lever 12. Owing to this arrangement, it is possible to move the tractor in a direction parallel to itself, or to cause it to exert power at a greater or less angle. In this latter case (tacking) the bar 10 is lifted and one of the trains of wheels is wedged.

On the chassis 9 is provided the motor 6 which, in the example shown, is a four-cylinder expansion motor but which may be electric, steam or of any other kind. By means of a suitable device, for example, a friction clutch 13, this motor operates a bevel pinion 14 arranged between two bevel wheels 15, 15'; these wheels are keyed to a transverse shaft 16, at one of the extremities of which is provided the pulley 5 provided with a suitable number of grooves (four in the case shown in Fig. 3) over which the cable 4 passes four times. A lever 17 allows of engaging either one or other of the bevel-wheels with the pinion 14 and consequently of changing the direction of motion of the pulley 5 so as to cause the tractor to move forward or backward. If this pulley 5 only were provided, there would be a great difficulty not to say an impossibility in obtaining a suitable motion of the tractor. It should further be remarked that in the present invention, the movement of the tractor is effected not by adherence of the wheels to the soil but simply by simultaneous coiling and uncoiling of the cable 4. Now, when under the action of the motor, the pulley 5 is caused to rotate, thus exercising tension on the portion of the cable, fixed to one of the anchors, this portion is necessarily lengthened; owing to this lengthening, there is a corresponding slackening of the cable behind the pulley 5, and in consequence of this slackening there is a continual slipping of the cable on the pulley 5. Under these conditions the tractor cannot advance. This explains why inventors who have attacked this problem have in general occupied themselves in making the wheels of the tractor driving members, while at the same time driving the drum which carries the cable, by means of the motor; this solution however presents several disadvantages, the principal being the necessity of making the wheels of the tractor both driving members and steering members.

In the present invention, as has already been said, the wheels of the tractor are not driven, but with the pulley 5 is combined a pulley 5' of the same diameter, having the same number of grooves and mounted on a shaft 18 parallel to the shaft 16 of the pulley 5, the faces of the two pulleys thus being in parallel vertical planes. Under these conditions, when the pulley 5 exerts power on the cable at the beginning of the operation as has already been said, the lengthening produced behind the pulley 5 is continually taken up on each of the portions surrounding the latter by means of the pulley 5' which rotates at a higher speed than that of the pulley 5; then, at a certain moment, when the slack of the portions of the cable is completely taken up, the two pulleys rotate at the same speed and the vehicle is drawn along regularly. This effect is produced moreover in the same manner whatever be the direction of motion of the tractor and whatever may be the relative positions of the pulleys 5, 5' with regard to each other.

It should further be remarked that before this operation, it is indispensable to make sure of the tension of the cable 4; it is for this purpose that the windlass 7 is employed which has been mentioned above. This windlass, mounted on one of the anchor-cars, allows of easily obtaining this tension in the cable, which is absolutely indispensable and without which it would be impossible to set the tractor in motion. This windlass also serves to take up the variations in length of the cable resulting from the shape of the portions of the earth to be worked.

The combination of the two pulleys 5 5' presents, moreover, another technical effect; if the pulley 5 alone were provided, the cable which is passed around it, especially if it is somewhat long, and in agricultural work, the cables often reach a length of 800 meters, always twists and the portions of the cable have a tendency to roll one over the other. This rolling action and the considerable torsion which is the consequence thereof, greatly wears the cable, and further, the rotating movement in question sets up entanglement with the cable of the grass and debris which may exist on the soil over which it passes.

The passage of the portions of the cable in the grooves of the second pulley provides for an exact guiding of the portions of the cable and while preventing any torsion avoids the disadvantages which have been pointed out. Rollers 19, provided at each extremity of one of the large sides of the chassis 1 assist in guiding the cable 4.

The connecting bar 2 which is constituted as is seen in Fig. 3 of a perforated rod which can slide in a socket also provided with holes, in which it can be fixed by means of pins, takes an important part, in that the point to which the plow or machine set in motion by the tractor is attached can be shifted so as to be nearer to or farther away from the chassis of the tractor, in such a manner as to equalize the couple developed by the force exercised on the cable, this couple varying according to the resistance of the machines moved.

It should be noted that the lateral position of the cable, and, consequently, the lateral position of the point of connection is so arranged as to permit of the hauling of machines of different sizes without the wheels of the tractor ever having to pass over the work already done.

It is convenient now to describe more completely the cars which serve for anchoring the cable 4. Each of these cars is formed of a chassis 20, mounted on two pairs of wheels 21; one of these cars, as has been said, is provided with a hook 8 receiving one of the ends of the cable; the other is provided with a windlass 7 the use of which has been indicated above. The wheels 21 of these cars are provided with metallic flanges or disks 22, concentric with the wheel and provided at their centers with a hole through which the hub of the wheel passes freely. The peripheries of these disks 22 are formed into knife-edges and project over the wheel tires so that the tires limit the penetration of the disks into the soil. Further each disk is mounted on the wheel which serves to support it by means of braces pressing on the spokes of the wheel immediately below the felly, the end of the brace which passes through the disk being provided with a screwed portion furnished with a nut; the screwing-up of these nuts in the position shown in Figs. 5 and 6 has for its object to arch the disks 22 and to make them take a substantially parabolical or conical form which is very favorable from the point of view of resistance to the deformation which the traction cable tends to produce.

It will be seen that with such an arrangement, it is unnecessary to provide the four wheels of the car with anchor-disks, two disks being sufficient at the sides at which the cable is attached. When it is desired to transport the anchor-cars on a road the disks are detached from the wheels of the anchor cars. The anchor-cars thus constituted are placed perpendicular to the line of movement of the tractor; they are displaced by any convenient means.

What I claim as my invention and desire to secure by Letters Patent is:—

1. A hauling device comprising a tractor, a cable, anchors for the ends of said cable, two pulleys on said tractor disposed in alinement one with the other, said pulleys having each a number of grooves for the reception of said cable wound around them, and being mounted at an invariable distance apart, one of said pulleys being free, while the second of said pulleys is fast, and a prime mover on said tractor for imparting movement to the second of said pulleys.

2. A hauling device comprising a tractor and an implement or body to be hauled, means of connection of the latter to the tractor, a cable passing between them, anchors for the ends of said cable, two pulleys on said tractor disposed in alinement one with the other, said pulleys having each a number of grooves for the reception of said cable wound around them, one of said pulleys being free, while the second of said pulleys is fast, and a prime mover on said tractor for imparting movement to the second of said pulleys.

3. A hauling device comprising a tractor, a cable, anchors for the ends of said cable, two pulleys on said tractor disposed in alinement one with the other, said pulleys having each a number of grooves for the reception of said cable wound around them, and being mounted at an invariable distance apart, one of said pulleys being free, while the second of said pulleys is fast, and a prime mover on said tractor for imparting movement to the second of said pulleys, and means for varying the direction of movement imparted to said pulley.

4. A hauling device comprising a tractor and an implement or body to be hauled, means of connection of the latter to the tractor, a cable passing between them, anchors for the ends of said cable, two pulleys on said tractor disposed in alinement one with the other, said pulleys having each a number of grooves for the reception of said cable wound around them, one of said pulleys being free, while the second of said pulleys is fast, and a prime mover on said tractor for imparting movement to the second of said pulleys, and means for varying the direction of movement imparted to said pulley.

5. A hauling device comprising a tractor and an implement or body to be hauled, means of connection of the latter to the tractor, a cable passing between them, anchors for the ends of said cable, means on one of said anchors for applying tension to said cable, two pulleys on said tractor disposed in alinement one with the other, said pulleys having each a number of grooves, for the reception of said cable wound around them, one of said pulleys being free, while the second of said pulleys is fast, and a prime mover on said tractor for imparting movement to the second of said pulleys.

6. A hauling device comprising a tractor and an implement or body to be hauled, means of connection of the latter to the tractor, a cable passing between them, anchors for the ends of said cable, a windlass on one of said anchors for applying tension to said cable, two pulleys on said tractor disposed in alinement one with the other, said pulleys having each a number of grooves for the reception of said cable wound around them, one of said pulleys being free, while the second of said pulleys is fast and a prime mover on said tractor for imparting movement to the second of said pulleys.

7. A hauling device comprising a tractor, a cable, anchors for the ends of said cable, said anchors comprising wheels and said wheels carrying concave disks thereon having cutting edges and being of larger diameter than the said wheels, two pulleys on said tractor disposed in alinement one with the other, said pulleys having each a number of grooves for the reception of said cable wound around them, and being mounted at an invariable distance apart, one of said pulleys being free, while the second of said pulleys is fast, and a prime mover on said tractor for imparting movement to the second of said pulleys.

8. A hauling device comprising a tractor and an implement or body to be hauled, means of connection of the latter to the tractor, a cable passing between them, anchors for the ends of said cable, said anchors comprising wheels and said wheels carrying concave disks thereon having cutting edges and being of larger diameter than the said wheels, two pulleys on said tractor disposed in alinement one with the other, said pulleys having each a number of grooves for the reception of said cable wound around them, one of said pulleys being free, while the second of said pulleys is fast, and a prime mover on said tractor for imparting movement to the second of said pulleys.

9. A hauling device comprising a tractor and an implement or body to be hauled, a connection of the latter to the tractor, a cable passing between them, two pulleys mounted on said tractor upon which said cable is wound and unwound, one of said pulleys being free to rotate, and means for imparting movement to the other of said pulleys.

10. A hauling device comprising a tractor and an implement or body to be hauled, a connection of the latter to the tractor, a cable passing between them, two pulleys mounted on said tractor upon which said cable is wound and unwound, one of said pulleys being free to rotate, and means for imparting movement to the other of said pulleys in one direction or the other.

11. A hauling device comprising a tractor and an implement or body to be hauled, a connection of the latter to the tractor, a cable passing between them, two pulleys mounted on said tractor upon which said cable is wound and unwound, one of said pulleys being free to rotate, and means for imparting movement to the other of said pulleys and for applying tension to said cable.

12. A hauling device comprising a tractor and an implement or body to be hauled a connection of the latter to the tractor, a cable passing between them, two pulleys mounted on said tractor upon which said cable is wound and unwound, said pulleys being mounted at an invariable distance apart, one of said pulleys being free to rotate, and means for imparting movement to the other of said pulleys.

In testimony whereof I have hereunto signed my name to this specification in the presence of two subscribing witnesses.

GEORGES FILTZ.

Witnesses:
H. C. COXE,
MIGUEL FEROLO.

Copies of this patent may be obtained for five cents each, by addressing the "Commissioner of Patents, Washington, D. C."